United States Patent [19]

Kato et al.

[11] Patent Number: 4,881,142
[45] Date of Patent: Nov. 14, 1989

[54] MAGNETIC DISC UNIT EMPLOYING TEMPERATURE COMPENSATION

[75] Inventors: Masahiro Kato, Chichibu; Yuichi Kakuta, deceased, late of Fukushima, both of Japan, by Rokuroh Kakuta, legal representative

[73] Assignee: Canon Denshi Kabushiki Kaisha, Chichibu, Japan

[21] Appl. No.: 256,830

[22] Filed: Sep. 30, 1988

Related U.S. Application Data

[63] Continuation of Ser. No. 852,150, Apr. 15, 1986, abandoned.

[30] Foreign Application Priority Data

Apr. 19, 1985 [JP] Japan .................................. 60-82273
Jul. 12, 1985 [JP] Japan ................................. 60-152169
Aug. 16, 1985 [JP] Japan ................................. 60-179494

[51] Int. Cl.$^4$ .............................................. G11B 5/55
[52] U.S. Cl. ................................ 360/106; 360/97.04; 360/109
[58] Field of Search ... 360/106, 105, 109, 97.02–97.04; 310/64; 318/639

[56] References Cited

U.S. PATENT DOCUMENTS

| | | | |
|---|---|---|---|
| 4,096,537 | 6/1978 | Butsch | 360/106 |
| 4,393,425 | 7/1983 | Wright | 360/106 |
| 4,602,305 | 7/1986 | Ghose | 360/97 |
| 4,665,453 | 5/1987 | Mikamoto et al. | 360/96.6 |

FOREIGN PATENT DOCUMENTS 0055568 7/1982 European Pat. Off. .

Primary Examiner—Stuart N. Hecker
Assistant Examiner—David J. Severin
Attorney, Agent, or Firm—Spencer & Frank

[57] ABSTRACT

A magnetic head supporting member, on which is mounted a magnetic head for recording and/or reproducing of information on a magnetic disc, is mounted on a magnetic head driving motor through a temperature-compensating member. Owing to the above construction, since each of the length, shape and thermal expansion coefficient of the temperature-compensating member has considerable flexibility in selection, it is possible to obtain an excellent magnetic disc unit in which desired temperature-compensating conditions can be easily obtained without any loss of flexibility in designing of the material, position and length of each constituent member of the magnetic disc unit.

18 Claims, 11 Drawing Sheets

MAGNETIC DISC UNIT EMPLOYING TEMPERATURE COMPENSATION

BACKGROUND OF THE INVENTION

This application is a continuation of application Ser. No. 852,150 filed Apr. 15, 1986, now abandoned.

FIELD OF THE INVENTION

The present invention relates to a magnetic disc unit, and more particularly to a magnetic disc unit provided with a temperature-compensating mechanism for positioning of a magnetic head.

DESCRIPTION OF THE PRIOR ART

A magnetic disc unit conducts magnetic recording and reproducing operations on various kinds of magnetic discs such as a floppy disc and a hard disc with extremely narrow pitches, for example 0.1 mm, in a diametrical direction of such disc, so that even a slight misalignment in positioning of a magnetic head of the unit causes a serious effect in the magnetic recording and reproducing operations.

As a cause of such misalignment, there exists unevenness of part accuracy. Moreover, even when such unevenness is eliminated, there still exists a problem of the misalignment in positioning of the magnetic head due to thermal expansion and contraction of the magnetic disc itself and of constituent parts such as a chassis and a magnetic head carrier carrying the magnetic head of the unit caused by their temperature variations.

FIG. 1 is a plan view of an example of a magnetic head positioning mechanism of a conventional magnetic disc unit. FIG. 2 is a side view of the example shown in FIG. 1. In this conventional magnetic disc unit, the magnetic head is arranged below the magnetic disc, while the head carriage carrying the magnetic head is driven by a linear motor.

In FIGS. 1 and 2, the magnetic head 1 is provided on a front end portion of the head carriage 3. A pad arm 5 is disposed on the head carriage 3, a pressure applying pad 7 is fixed to a front end of the pad arm 5 so as to be opposed to the magnetic head 1, while the other end of the pad arm 5 is swingably mounted on the head carriage 3 through an axle 5A.

Around the axle 5A is coaxially mounted a torsion coil spring 9, an end of which abuts against the pad arm 5 while the other end abuts against the head carriage 3, so that the pad arm 5 is urged counterclockwise by the spring 9. The rear end of the head carriage 3 is fixed to a traveling element 13 by screws 11. This traveling element 13 constitutes a movable element of the linear motor for positioning of the magnetic head 1, and is provided in a position adjacent to the stator 15 of the linear motor, and movable in directions shown by arrows "A" and "B" in FIG. 1 to position the magnetic head 1 on a predetermined track position. The stator 15 is fixed to a chassis 19 by screws 17.

In an underside of the chassis 19 is provided a motor 21 for rotatably driving the magnetic disc. To a front end of a spindle 21A, which constitutes an output shaft of the motor 21, a spindle hub 21B is fixed. A magnet (not shown in FIGS. 1 and 2) is fixed to the spindle 21B and attracts a center hub 23A which is made of magnetic material and fixed to the magnetic disc 23. The spindle hub 21B is provided with a drive pin 21C in a position apart from the center of the spindle 21A in a projection manner, the drive pin 21C being inserted in an opening 23B formed in the center hub 23A to drive the magnetic disc 23.

In the conventional magnetic disc unit having the above construction, the magnetic disc 23 is sandwiched between the magnetic head 1 and the pad 7 while being driven in the directions shown by the arrows "A" and "B" to conduct magnetic recording and reproducing operations.

In the conventional unit having such construction, in order to compensate for misalignment in positioning of the magnetic head due to temperature variation, combinations of the following factors are employed to make it possible that a positioning deviation of the magnetic head due to a temperature variation is coincident with a dimensional change of the magnetic disc due to its thermal expansion.

(1) The distance between the center of the spindle (the center of the magnetic disc) and the mounting position of the linear motor.

(2) The thermal expansion coefficient of the chassis material.

(3) The length and the thermal expansion coefficient of the head carriage.

As shown in, FIG. 1, provided that; reference character $l_1$ denotes the distance between the center of the magnetic disc 23 and a predetermined track (a central track in FIG. 1); $l_2$ the distance between the center of the spindle 21A (the center of the magnetic disc 23) and the centers of the screws 17 of the stator 15 of the linear motor; $l_3$ the effective length of the head carriage 3 (the distance between the head gap position of the magnetic head 1 and the centers of the screw 11 fixing the head carriage 3 to the traveling element 13); $\alpha_1$ the thermal expansion coefficient of the magnetic disc 23; $\alpha_2$ a thermal expansion coefficient of the chassis 19; and $\alpha_3$ the thermal expansion coefficient of the head carriage 3, the temperature compensating of the magnetic disc unit is hitherto performed by determining each value of the $l_2$, $\alpha_2$, $l_3$ and $\alpha_3$ so as to satisfy the following equation (1):

$$l_1 \times \alpha_1 - l_2 \times \alpha_2 + l_3 \times \alpha_3 = 0 \tag{1}$$

where: $\alpha_1$ and $l_1$ are previously determined while $l_1 = l_2 - l_3$, so that the $l_2$ can be defined by determining the $l_3$ and vice versa. As a result, such temperature-compensating is hitherto performed by determining three values, i.e., the $l_2$ (or $l_3$), $\alpha_2$ and $\alpha_3$.

The following equation (2) is derived from the above equation (1):

$$l_2(\alpha_2 - \alpha_3) - l_1(\alpha_1 - \alpha_3) = 0 \tag{2}$$

Since the $l_1$ and $\alpha_1$ are previously determined, in case that materials employed in the chassis 19 and the head carriage 3 are determined, the mounting position ($l_2$) of the linear motor is defined. As a result, the conventional magnetic disc unit suffers from a poor flexibility in its design. Further, in case it is difficult to mount the stator 15 of the linear motor in a position defined by the $l_2$ of the equation (2), it is not possible to fully satisfy the equation (1) and consequently to compensate for the misalignment in positioning of the magnetic head caused by the temperature variation. In contrast with this, when the mounting position of the linear motor is first determined, it is difficult to find out the combination of the materials of the chassis and the head carriage having the thermal expansion coefficients $\alpha_2$ and $\alpha_3$ respectively for satisfying the equation (1), so that it is difficult to eliminate the misalignment in positioning of the magnetic head caused by the temperature variation. Further, in this case, there is another problem that materials, which have necessary properties such as sufficient mechanical strengths for the chassis and head carriage members and appropriate amounts of the thermal expansion coefficient, are extremely limited in number, so that the selection ranges of such materials are considerably narrow.

FIG. 3 is a plan view of another example of the positioning mechanism for the magnetic head of the conventional magnetic disc unit. In this conventional unit, the magnetic head is driven by a cam mechanism in which a lead screw and an engaging pin are employed as a cam and a cam follower, respectively. In FIG. 3, parts similar to those of the unit shown in FIGS. 1 and 2 are denoted by the same reference numerals as those used in FIGS. 1 and 2, and descriptions thereof are hereinbelow neglected to avoid repetition. The magnetic head 1 is positioned in a lower surface (0-surface) of the magnetic disc 23 (for example such as a floppy disc), and is generally called by the name of 0-surface magnetic head.

The head carriage 24 is provided with two guide portions 24A in its one side and an arm 24B in its other side. A guide bar 25, which guides the head carriage 24 in its traveling movement, penetrates the guide portions 24A and is so fixed to the chassis 19 that the traveling direction of the magnetic head 1 passes through the center of the magnetic disc 23. In FIG. 3: reference numeral 27 denotes a plate for clamping the guide bar 25; and 29 a bolt for fixing the guide bar 25. In the lower surface of the front end of the arm 24B is provided a guide pin 24C which acts as a cam follower. The guide pin 24C engages with a screw groove of a lead screw 31 which acts as a cam. The lead screw 31 is rotatably driven by a motor 33 fixed to a mounting portion 19A of the chassis 19. The head carrier 24 is caused to travel by the rotation of the motor 33 so that the magnetic head 1 is moved in directions "A" and "B" shown in FIG. 3. Thus, the magnetic head 1 is positioned in a, desired position on the magnetic disc 23.

For the case in which a double-faced magnetic disc is employed, in addition to the magnetic head 1 provided in the 0-surface of the magnetic disc 23, one more magnetic head (1-surface magnetic head) is provided in a position opposite to that of the magnetic head 1 to make it possible to conduct recording and reproducing operations in opposite surfaces of the magnetic disc.

In the magnetic disc unit having the above conventional construction, in order to eliminate misalignment in positioning of the magnetic head caused by temperature variations, combinations of the following factors are so employed that the positioning deviation of the magnetic head caused by the temperature variation is coincident with the dimensional change of the magnetic disc caused by the temperature variation.

(1) The distance between the center of the spindle (the center of the magnetic disc) and the mounting position of the motor 33.

(2) The thermal expansion coefficient of the chassis material.

(3) The length and the thermal expansion coefficient of the head carriage.

(4) The length and the thermal expansion coefficient of the lead screw.

For example, in FIG. 3, provided that: reference character $l_1$ denotes the distance between the center of the magnetic disc 23 and a predetermined track of the same; $\alpha_1$ the thermal expansion coefficient of the magnetic disc 23; $l_2$ the distance between the center of the spindle 21A (the center of the magnetic disc 23) and the mounting position of the motor 33; $\alpha_2$ the thermal expansion coefficient of the chassis member; $l_3$ the effective length of the head carriage 24 (the distance between the position of the head gap 1A and the center of the guide pin 24C); $\alpha_3$ the thermal expansion coefficient of the head carriage 24; $l_4$ the length of the leading screw 31 between the center of the guide pin, 24C and the mounting position of the motor 33; and $\alpha_4$ the thermal expansion coefficient of the lead screw 31, values of the $l_2$, $\alpha_2$, $l_3$, $\alpha_3$, $l_4$ and $\alpha_4$ are so determined that they satisfy the following equation (3) to compensate the temperature variation:

$$l_1 \times \alpha_1 - l_2 \times \alpha_2 + (l_3 \times \alpha_3 + l_4 \times \alpha_4) = 0 \tag{3}$$

The $l_1$ and $\alpha_1$ regarding the magnetic disc are previously determined as is in the conventional example shown in FIG. 1., The lead screw 31 must not be shorter than the maximum displacement of the magnetic head 1, while if it is too long it produces a deflection which leads to misalignment in positioning of the magnetic head. Consequently, the lead screw 31 is limited in length in its design. Further, since the lead screw 31 is required to have sufficient rigidity, wear resistance and workability, materials suitable therefore are extremely limited in selection. As a result, an actual adjustment is almost made by varying each vale of the $l_2$, $\alpha_2$ regarding the chassis and the $l_3$, $\alpha_3$ regarding the head carriage 24. However, as shown in FIG. 3, since $l_1$ is defined as $l_1 = l_2 - (l_3 + l_4)$, two values, i.e., the $l_2$ and the $(l_3 + l_4)$ can be simultaneously defined when one of them is determined. As a result, only three values, i.e., the $l_2$ (or the $(l_3 + l_4)$), $\alpha_2$ and $\alpha_3$ are flexible values.

Consequently, as is in the conventional example shown in FIG. 1, the conventional example shown in FIG. 3 also has a problem in that: when the materials to be employed in the unit are determined, the mounting position of the motor 33 is thereby defined so that in this sense the unit loses its design flexibility.

Therefore it is difficult to mount the motor at the preferable position and to fully satisfy the equation (3), so that compensation for temperature variations is insufficient. Further, if the mounting position of the, motor 33 is first determined, it becomes difficult to determine combinations of the $\alpha_2$, $\alpha_3$ for satisfying the equation (3), so that it is impossible to sufficiently compensate for temperature variation of the unit. In contrast with this, in the case in which $\alpha_2$, $\alpha_3$ are first determined to compensate for temperature variation, it becomes a problem that conditions regarding the materials to be employed in the unit are limited in selection.

Although, in the above, explanation is made as to a problem regarding the 0-surface magnetic head disposed in the lower surface of the magnetic disc, the 1-surface magnetic head disposed in an upper surface of the magnetic disc also has the same problem.

SUMMARY OF THE INVENTION

Consequently, it is an object of the present invention to provide a magnetic disc unit which resolves the above disadvantage inherent, in the conventional magnetic disc unit thereby leading to lead to elimination of misalignment of the magnetic head caused by temperature variations.

For accomplishing the above object, in the first aspect of the present invention, the magnetic disc unit of the present invention comprises:

means for driving a magnetic disc;

a magnetic head for recording and/or reproducing information in the magnetic disc;

magnetic head driving means for transferring the magnetic head to a desired position on the magnetic disc; and a magnetic head supporting member which supports the magnetic head and is mounted on the magnetic head driving means via a temperature-compensating member.

Here, the magnetic head driving means may be a linear motor. The magnetic head supporting member may be mounted on a traveling element of the linear motor via the temperature-compensating member. The magnetic head driving means may include a cam mechanism driven by a motor. The magnetic head supporting member may be mounted on a cam follower of the cam mechanism via the temperature compensating member. The temperature-compensating member may be made of polycarbonate resin.

In the second aspect of the present invention, a magnetic disc unit comprises:

means for driving a magnetic disc;

first and second magnetic heads for recording and/or reproducing information on opposite surfaces of the magnetic disc;

magnetic head driving means for transferring both the first and second magnetic heads to desired positions on the magnetic disc;

a first magnetic head supporting member which supports the first magnetic head and is mounted on the magnetic head driving means via a temperature-compensating member; and a second magnetic head supporting member which supports the second magnetic head and is mounted on the magnetic head driving means via the temperature compensating member.

Here, the magnetic head driving means may be a linear motor. The magnetic head supporting member may be mounted on a traveling element of the linear motor via the temperature-compensating member. The magnetic head driving means may be a cam mechanism driven by a motor. The magnetic head supporting member may be mounted on a cam follower of the cam mechanism via the temperature-compensating member. The temperature-compensating member may be made of polycarbonate resin. The first magnetic head supporting member and the second magnetic head supporting member have small thermal expansion coefficients which may be substantially the same.

Here, the first magnetic head supporting member and the second magnetic head supporting member may be made of the same material. The first magnetic supporting member and the second magnetic head supporting member may be made of stainless steel. The first magnetic head supporting member and the second magnetic head supporting member may be made of phosphor bronze. The first magnetic head supporting member and the second magnetic head supporting member may be made of partially different metals. A plurality of discs may be used instead of one magnetic disc; and the magnetic head comprises a plurality of pairs of the first and second magnetic heads.

In the third aspect of the present invention, a head access unit comprises:

a head means for recording and/or reproducing signals on a recording medium;

a head displacing means for displacing the head means along a surface of the recording medium; and a compensating means provided between the head means and the head displacing means, and compensating a relative misalignment between the head means and the recording medium.

Here, the recording medium has a disc-like shape. The recording medium may be a magnetic disc. The head means may comprise a magnetic head. The head displacing means may comprise a motor. The head means may comprise a plurality of heads acting on the recording media. The plurality of the heads may be commonly connected to one compensating means. The head access unit may further comprise a plurality of supporting members, each interposed between each of the heads and the compensating means, and each having substantially the same thermal properties.

The above and other objects, effects, features and advantages of the present invention will become more apparent from the following description of preferred embodiments thereof taken in conjunction with the accompanying drawings.

BRIEF DESCRIPTION OF THE DRAWINGS

FIGS. 9A to 11B are views illustrating another embodiment of the present invention, in which is employed a magnetic head assembly adapted for a double-faced magnetic disc, wherein:

FIGS. 9A, 9B and 9C are a side view, a plan view and a front view of, the magnetic disc unit of the present invention, showing the construction of a 0-surface magnetic head assembly and a 1-surface magnetic head assembly thereof, respectively;

FIGS. 11A and 11B are a side view and a bottom view of the 1-surface magnetic head assembly of the unit of the present invention;

DETAILED DESCRIPTION OF PREFERRED EMBODIMENTS

Embodiments of the present invention will be hereinbelow described with reference to the drawings.

Figure 1:
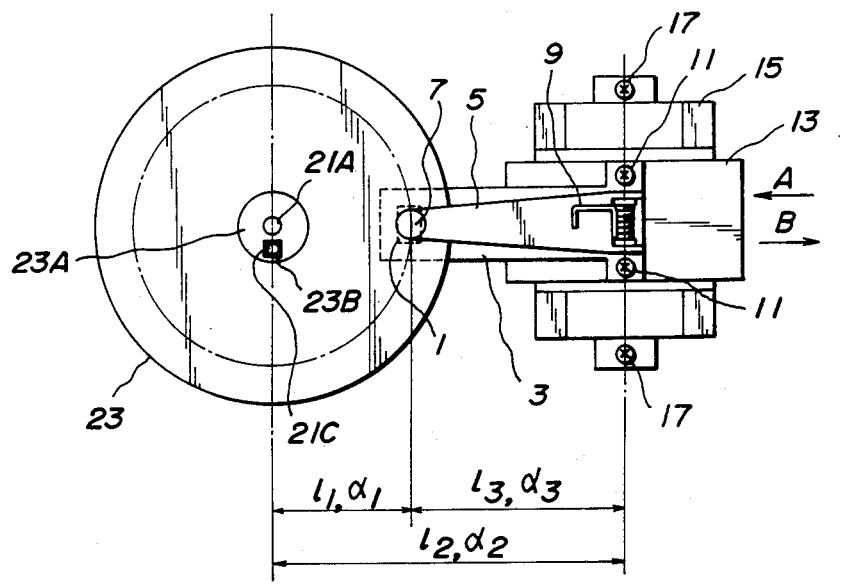
FIGS. 1 and 2 are a plan view and a side view of a conventional magnetic disc unit, respectively.
Figure 2:
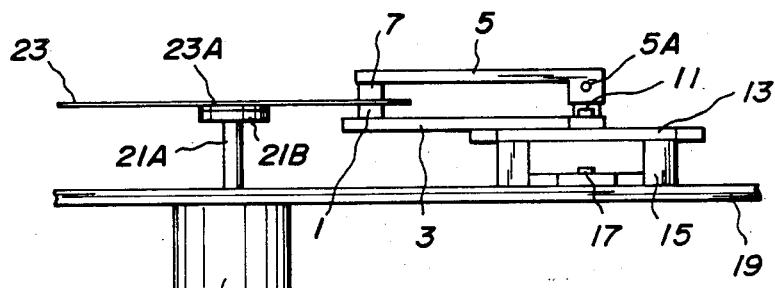
Figure 4:
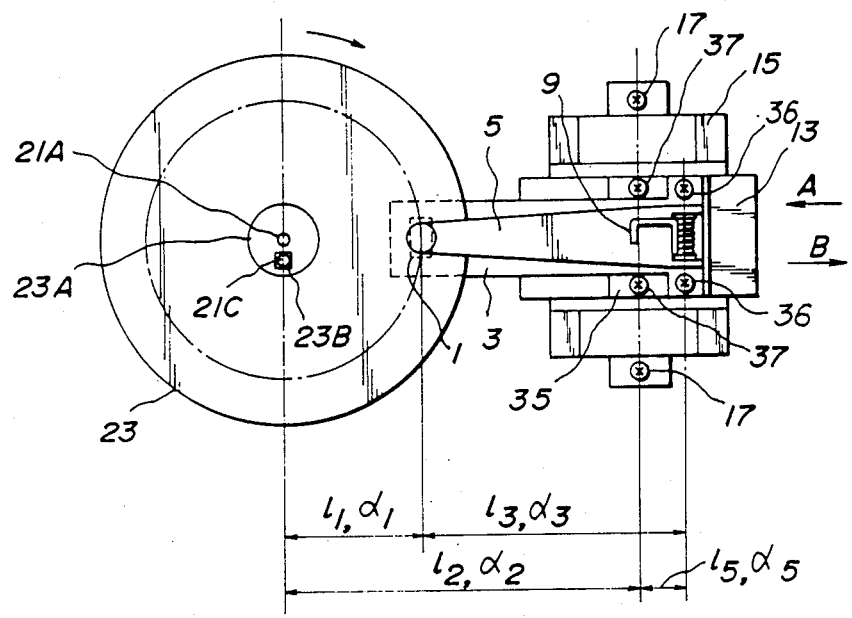
FIGS. 4 and 5 are a plan view and a side view of an embodiment of the present invention corresponding to the conventional example shown in FIGS. 1 and 2, respectively.
Figure 5:
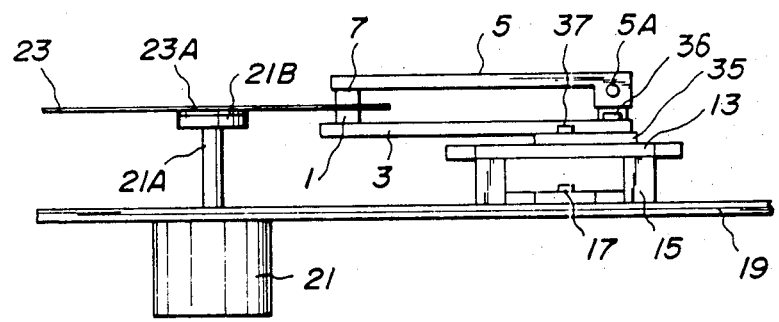

FIGS. 4 and 5 are a plan view and a side view of an embodiment of the magnetic disc unit of the present invention corresponding to the conventional example shown in FIGS. 1 and 2, respectively, which magnetic disc unit of the present invention is provided with a magnetic head driving mechanism taking the form of a linear motor. In FIGS. 4 and 5, parts of the unit of the present invention, similar to the parts of the conventional unit shown in FIGS. 1 and 2 are denoted by the same reference numerals as those denoting the parts of the conventional unit so that the descriptions of such parts are hereinbelow neglected to avoid repetition.

In an embodiment of the magnetic disc unit of the present invention as shown in FIGS. 4 and 5, an adjusting member 35 for conducting temperature-compensating (a temperature-compensating member 35) is arranged between a magnetic head carriage 3 and a traveling element 13. The temperature-compensating member 35 is fixed to the traveling element 13 through screws 37 in the vicinity of its end portion near a magnetic head 1. A base end of the head carriage 3 is fixed to an end portion of the temperature-compensating member 35 through screws 36, which end portion is opposite to the other end portion in which the screws 37 are provided. Both the temperature-compensating member 35 and the head carriage 3 are fixed by the screws so that both of them are detachable. As a result, the designer has a freedom of choice in material, shape and size of the temperature-compensating member 35.

In designing of the magnetic disc unit of the present invention, as shown in FIG. 4, in addition to the $l_1$, $l_2$, $l_3$ and $\alpha_1$, $\alpha_2$ and $\alpha_3$, there are further added additional designing factors $l_5$ and $\alpha_5$. FIG. 4 shows a case in which the magnetic head 1 is disposed on a central track of the magnetic disc, i.e., a case in which the screws 37 fixing the temperature-compensating member 35 to the traveling element 13 and the screws 17 fixing the stator 15 to the chassis 19 are disposed on the same straight line. Reference character $l_5$ denotes the effective length of the temperature-compensating member 35, i.e., the distance between the center of the screw 37 and the center of the screw 36; and $\alpha_5$ thermal expansion coefficient of the temperature-compensating member 35. When the temperature-compensating member 35 is thus provided in the magnetic disc unit of the present invention, misalignment in positioning of the magnetic head 1 can be eliminated by satisfying the following equation (4):

$$l_1 \times \alpha_1 - (l_2 \times \alpha_2 + l_5 \times \alpha_5) + l_3 \times \alpha_3 = 0 \tag{4}$$

The temperature-compensation of the misalignment in positioning of the magnetic head can be performed by determining the material and the length of the temperature-compensating member 35 so as to satisfy the equation (4) after the chassis 19 and the head carriage 3 are appropriately selected.

The material of the temperature-compensating member 35 is required to have a large thermal expansion coefficient with little variation in quality, and a high rigidity and a good workability, and further, in addition to these properties, preferably required to be of low cost. For example, as material such as polycarbonate resin is preferable.

Figure 6:
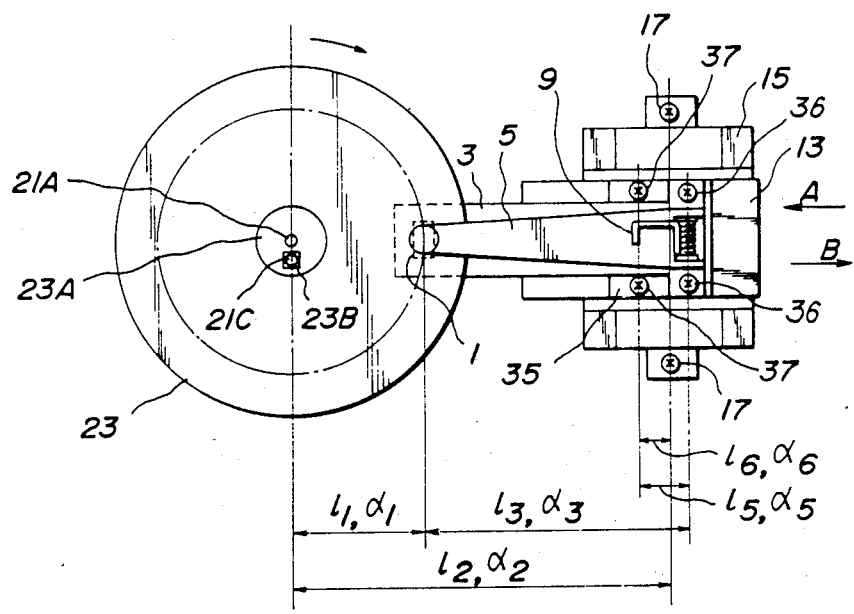
FIG. 6 is a plan view of the magnetic head positioning mechanism for illustrating the embodiment of the present invention.

FIG. 6 is a plan view illustrating another design concept according to the present invention, wherein the magnetic head 1 is disposed in a desired track of the magnetic disc 23. In FIG. 6: reference character $l_6$ denotes the traveling distance of the traveling element 13, i.e. the distance between the center of the screw 37 fixing the temperature-compensating member 35 and the center of the screw 17 fixing the stator 15; and $\alpha_6$ the thermal expansion coefficient of the traveling element 13. In this case, the temperature-compensation of the unit can be performed by satisfying the following equation (5):

$$l_1 \times \alpha_1 - (l_2 \times \alpha_2 + l_5 \times \alpha_5 - l_6 \times \alpha_6) + l_3 \times \alpha_3 = 0 \tag{5}$$

Since the traveling element 13 is made of a magnetic material such as iron and therefore its thermal expansion coefficient is known and since the length is appropriately selectable, it is also possible to compensate for misalignment in positioning of the magnetic head by appropriately selecting the material and the length of the temperature compensating member 35.

According to the embodiment of the present invention shown in FIGS. 4 to 7, it is possible that selection of each of the materials employed in the chassis and the head carriage, and furthermore the mounting position of the linear motor, has considerable flexibility.

Figure 3:
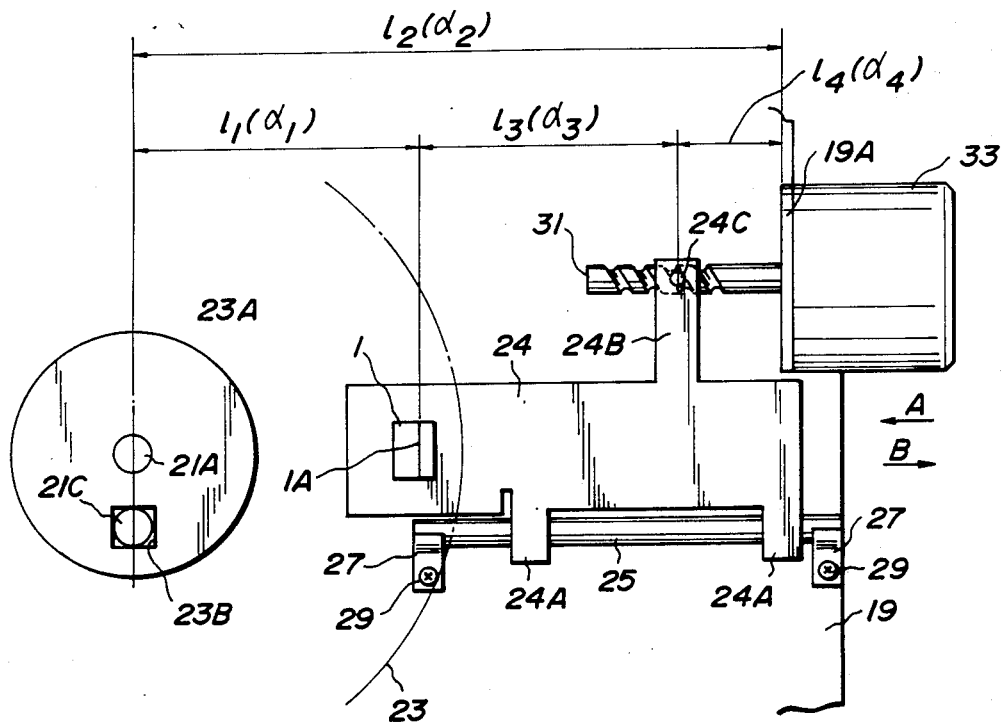
FIG. 3 is a plan view of the magnetic head positioning mechanism of another conventional magnetic disc unit.
Figure 7:
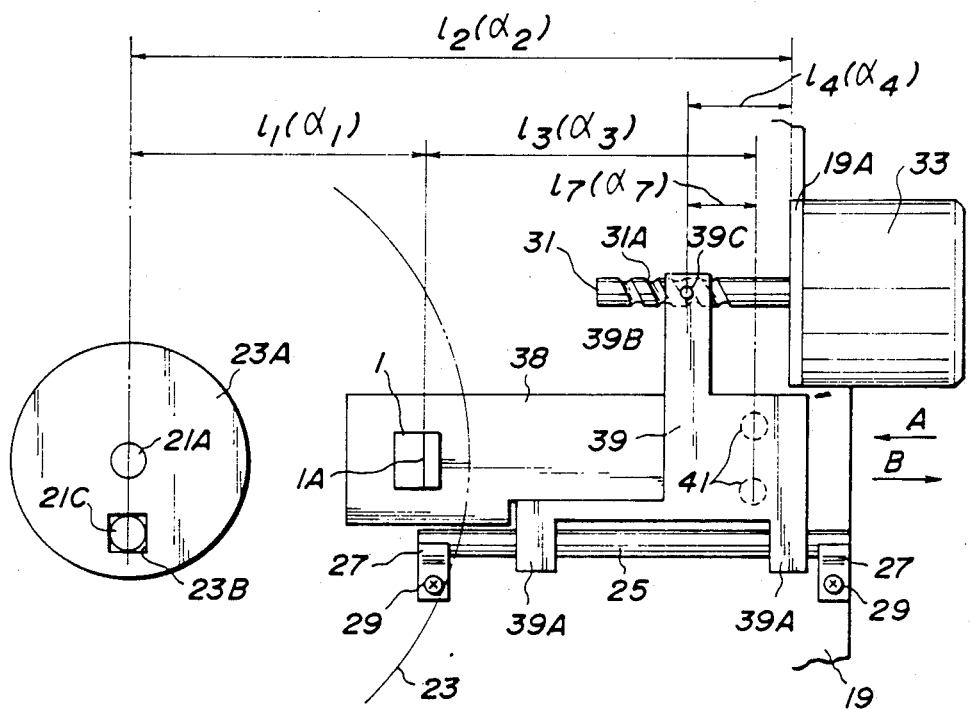
FIGS. 7 and 8 are a plan view and a side view of an embodiment of the present invention corresponding to the conventional example shown in FIG. 3, respectively.
Figure 8:
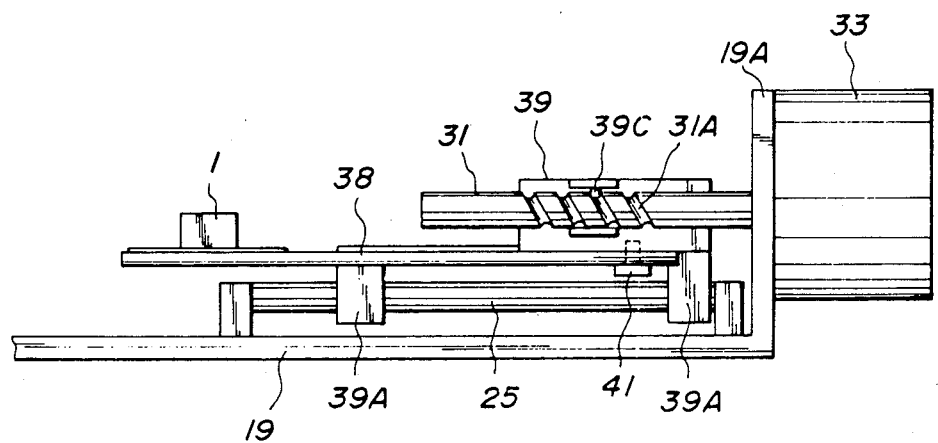

FIGS. 7 and 8 are a plan view and a side view of another embodiment of the present invention, respectively. In this embodiment, a cam mechanism is employed as the magnetic head positioning mechanism. In FIGS. 7 and 8, parts similar to those shown in FIG. 3 are denoted by the same reference numerals as those denoting the parts shown in FIG. 3 so that their explanation will be hereinbelow neglected to avoid repetition. The magnetic head 1 is fixed to the head carriage 38 which is fixed to the temperature-compensating member 39. This member 39 is provided with guide portions 39A, an arm 39B and a guide pin 39C and engaged with a guide bar 2 through the guide portions 39A thereof and with a lead screw 31 through the guide pin 39C thereof, as is in the case of the head carriage 24 shown in FIG. 3. As shown in FIG. 8, the head carriage 38 is fixed to the temperature-compensating member 39 through screws 41 which are fastened from under the head carriage 38.

In FIG. 7, provided that: reference character $l_1$ denotes the distance between the center of the magnetic disc 23 and a desired track of the same; $\alpha_1$ the thermal expansion coefficient of the magnetic disc 23; $l_2$ the distance between the center of the spindle 21A (namely, the center of the magnetic disc 23) and the mounting position of the motor 33; $\alpha_2$ a thermal expansion coefficient of the chassis member; $l_3$ the length of the head carriage 38 (the distance between a position of the head gap of the magnetic head and the center of the screw 41 fixing the head carriage 38); $\alpha_3$ the thermal expansion coefficient of the head carriage 38; $l_4$ the length of the leading screw 31 between the center of the guide pin 39C and the mounting position of the motor 33; $\alpha_4$ the thermal expansion coefficient of the lead screw 31; $l_7$ the effective length of the temperature-compensating member 39 (the distance between the center of the guide pin 39C and the center of the screw 41 in the traveling direction of the magnetic head 1); and $\alpha_7$ the thermal expansion coefficient of the temperature-compensating member 39; the following equation (6) represents the temperature-compensating condition of the magnetic disc unit:

$$l_1 \times \alpha_1 - (l_2 \times \alpha_2 + l_7 \times \alpha_7) + (l_3 \times \alpha_3 + l_4 \times \alpha_4) = 0 \qquad (6)$$

The above construction enables the designer to select each value of $\alpha_2$, $l_2$, $\alpha_3$ and $l_3$ at will, provided that the thermal expansion coefficient $\alpha_7$ and the length $l_7$ of the temperature-compensating member 39 are adjusted to satisfy the equation (6), so that each of the materials of the chassis and the head carriage and furthermore the mounting position of the motor 33 has considerably design flexibility. Consequently, it is possible to fully satisfy the temperature-compensating conditions of the unit and possible to provide an excellent magnetic disc unit without any fear of causing misalignment in positioning of the magnetic head 1 relative to the desired track position of the magnetic disc 23 resulted from variations in temperature. According to the above construction, it is possible to easily compensate for temperature variation in the magnetic disc unit by changing the temperature-compensating member 39 even when the thermal expansion coefficient of the magnetic disc 23 varies. This is an advantage inherent in the magnetic disc unit of the present invention.

An embodiment of the magnetic disc unit of the present invention, which conducts recording/reproducing in a double-faced magnetic disc by using the positioning mechanism of the magnetic head 1 according to the cam mechanism shown in FIGS. 7 and 8 is shown in FIGS. 9A, 9B, 9C, 10A, 10B, 10C, 11A and 11B.

Figure 9A:
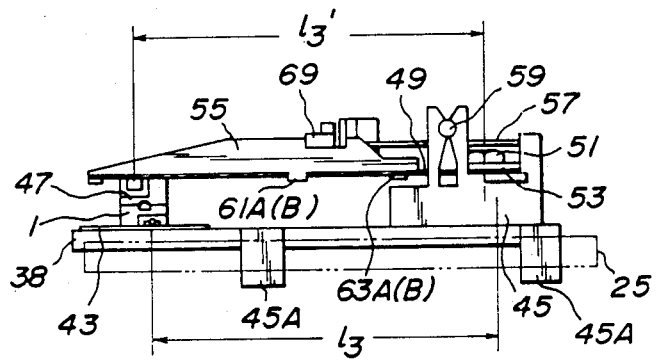
Figure 9B:
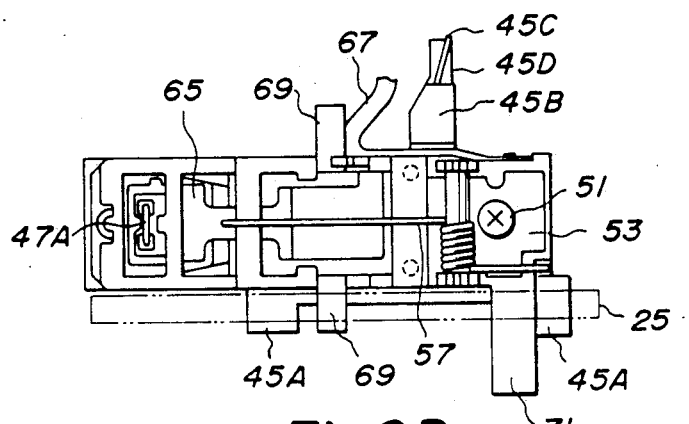
Figure 9C:
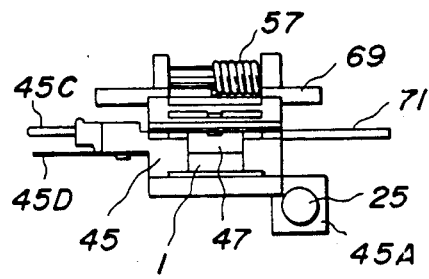
Figure 10A:
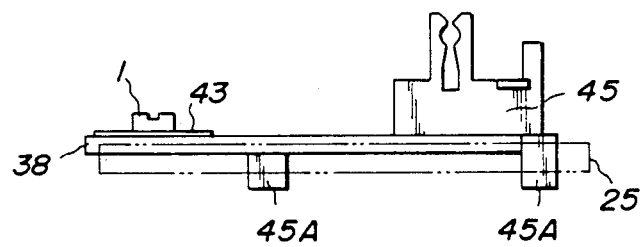
FIGS. 10A, 10B and 10C are a side view, a plan view and a bottom view of the magnetic disc unit of the present invention, showing the construction of the 0-surface magnetic head assembly thereof.
Figure 10B:
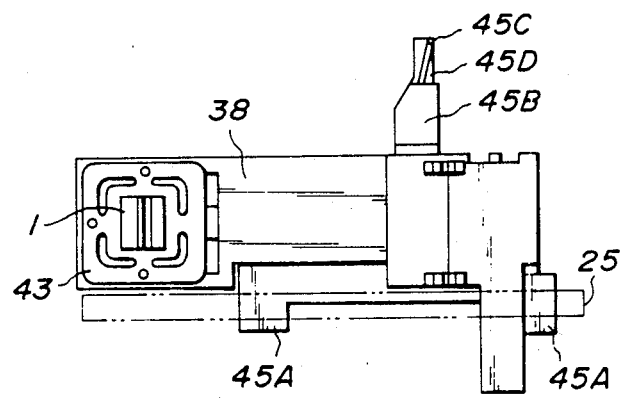
Figure 10C:
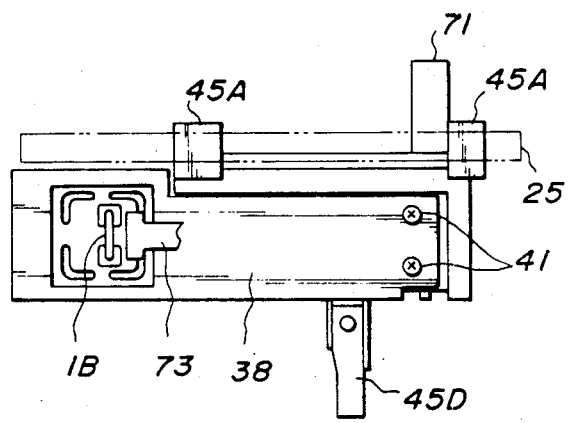
Figure 11A:
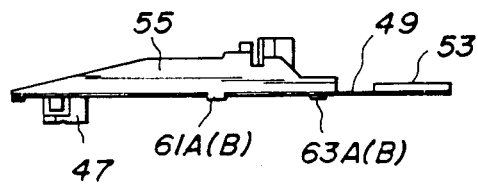
Figure 11B:
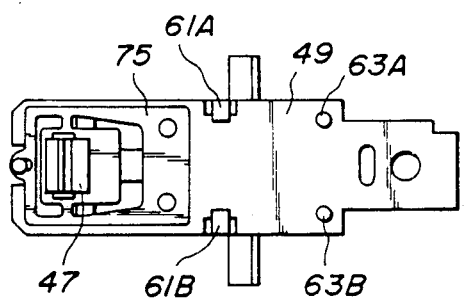

FIGS. 9A, 9B and 9C are a side view, a plan view and a front view of both head assemblies of an 0-surface magnetic head and a 1-surface magnetic head, showing the details thereof, respectively. FIGS. 10A, 10B and 10C are a side view, a plan view and a bottom view of the 0-surface magnetic head assembly, respectively. FIGS. 11A and 11B are a side view and a bottom view of the 1-surface magnetic head assembly, respectively. Reference numeral 43 denotes gimbals of the 0-surface magnetic head 1; and 45 a temperature-compensating member provided with guide portions 45A and an arm 45B. In the guide portions 45A a guide bar 25 is inserted and the arm 45B is provided with: a guide pin 45C engaging with a thread groove of the lead screw 31 and a set spring 45D the lead screw 31 is interposed between the set spring 45D and the guide pin 45C. The head carriage 38 of the 0-surface magnetic head 1 is fixed to the temperature-compensating member 45 from under member 45 as in the embodiment shown in FIG. 8. Reference numeral 47 denotes a 1-surface magnetic head oppositely disposed from the 0-surface magnetic head 1 and is provided n a front end of a 1-surface plate 49. The 1-surface plate 49 is constructed of a thin leaf spring so as to enable the 1-surface magnetic head 47 to move vertically, and is fixed to the temperature-compensating member 45 through a screw 51. Reference numeral 53 denotes a reinforcing plate for the 1-surface plate; 55 an arm for increasing the rigidity of the 1-surface plate; 57 a torsion spring for urging the 1-surface magnetic head 47 to the 0-surface magnetic head; 59 a pivot for the torsion spring's rotational movement; and 61A, 61B, 63A and 63B are projections for fixing the arm 55 to the 1-surface plate 49. These projections are provided in the bottom surface of the arm 55 and inserted into apertures provided in the 1-surface plate 49 and bonded thereto by welding or by means of adhesive so that the arm 55 is fixed to the 1-surface plate 49.

Incidentally, the projections 61A and 61B and the apertures corresponding thereto have tight tolerances only in a direction perpendicular to a longitudinal direction of the 1-surface plate 49. Reference numeral 47A denotes a back core of the 1-surface magnetic head 47; 65 a flexible printed circuit board for the 1-surface magnetic head; 67 a head cable; 69 a head lifter for conducting loading/unloading of the magnetic heads; and 71 a wing for detecting a 0-track of the magnetic disc. In FIG. 10C: reference numeral 1B denotes a back core of the 0-surface magnetic head 1; and 73 a flexible printed circuit board for the 0-surface magnetic head. In FIG. 11B, reference numeral 75 denotes gimbals for the 1-surface magnetic head.

In the above embodiment of the present invention, each of the head carriage 38 of the 0-surface head and the 1-surface head plate 49 is made of metal having a small thermal expansion coefficient of the substantially same order or made of the same kind of metal, for example preferably such as stainless steel or phosphor bronze each of which is small in thermal expansion coefficient, resistant to rust and is of a relatively low cost, these materials being preferably to be employed as a material of the magnetic head supporting member. On the other hand, the temperature-compensating member 45 is preferably made of polycarbonate resin.

The length ($l_3'$) of the 1-surface head plate 49 corresponding to the length $l_3$ of the head carriage 38 of the 0-surface head represented by the above-mentioned equation (6) corresponds to the distance between the position of the head gap of the 1-surface head 47 of the 1-surface head plate and the center of the fixing screw 51. Incidentally, the distance between the 0-surface magnetic head and the 1-surface magnetic head varies according to the floppy disc standards. For example, in case of a 5.25″ diameter disc, such distance is 2.12 mm (track interval 0.265 mm×8 tracks), and in case of a 3.5″ diameter disc, such distance is 1.5 mm (track interval 0.1875 mm×8 tracks). Consequently, the center of the screw 41, which fixes the head carriage 38 and acts as a datum point for compensating the 0-surface head, must be shifted by a distance corresponding to that between the 0-surface magnetic head and the 1-surface magnetic head from the center of the screw 51 which fixes the 1-surface head plate 49 and acts as a datum point served to compensate the 1-surface magnetic head.

As described above, since each of the 0-surface and the 1-surface magnetic heads are supported by the members having a small thermal expansion coefficient of the same material or of a like material and further since these supporting members are connected with the magnetic transferring mechanism through the common temperature-compensating member, it is possible to establish the thermal-compensation conditions of both the 0-surface and the 1-surface magnetic heads so as to satisfy the above equation (6).

Figure 12A:
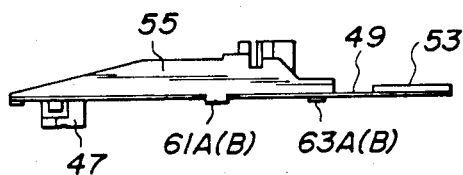
FIGS. 12A and 12B are a side view and a bottom view of another 1-surface magnetic head assembly having a different construction, respectively.
Figure 12B:
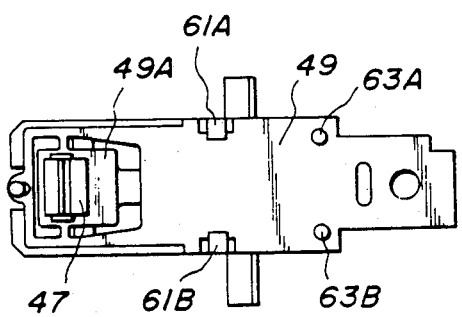

Although, in the embodiment shown in FIGS. 11A and 11B, the 1-surface magnetic head plate 49 of the 1-surface head assembly and the 1-surface magnetic head gimbals plate 75 are constituted by separate members, it is also possible to integrally form the gimbals portion 49A and the magnetic head plate 49 constructed of a thin leaf spring as shown in FIGS. 12A and 12B.

Further, in the separate type construction as shown in FIGS. 11A and 11B, it is also possible to construct the magnetic head plate 49 and the gimbals plate 75 out of different kinds of metals. In this case, the mounting position of the head carriage of the 0-surface magnetic head is deviated from that the 1-surface magnetic head plate by a distance corresponding to the difference in thermal expansion coefficient of the materials therebetween to make it possible to obtain the same effect as described above.

Although, in the above embodiment, the magnetic disc unit performs positioning of the magnetic head by means of the lead screw, it is also possible to apply a like construction to other magnetic disc units such as that employing a steel belt or a cam plate for performing positioning of the magnetic head.

Figure 13:
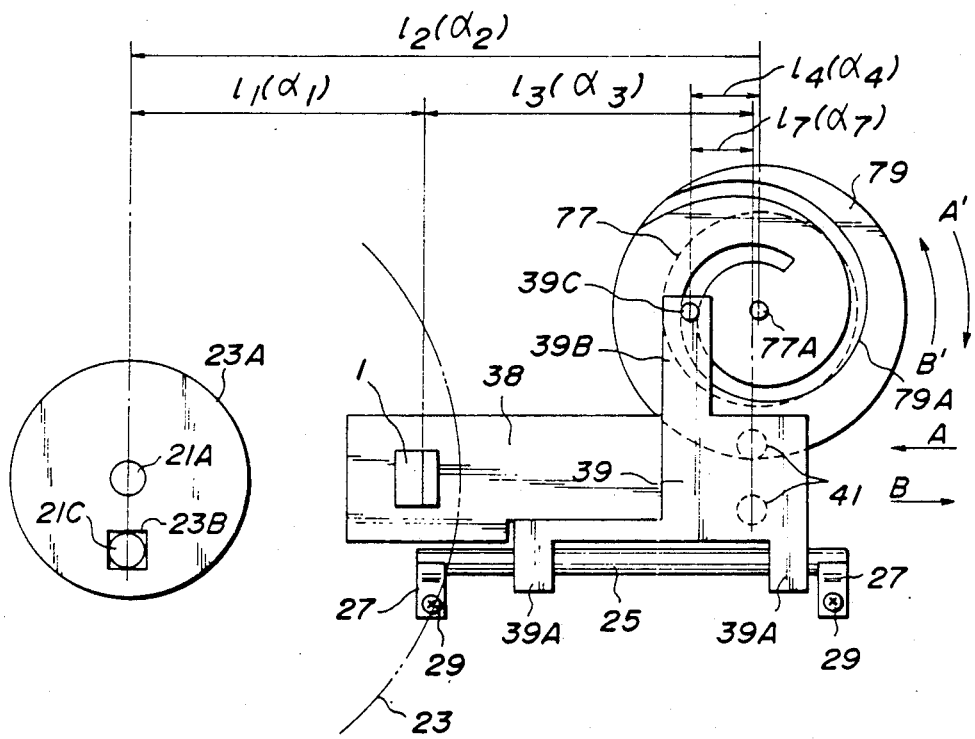
FIG. 13 is a plan view of a further embodiment of the present invention employing a different magnetic head driving/positioning system.

FIG. 13 shows another embodiment of the present invention, in which the magnetic head is moved by means of the cam plate having a circular shape. Constructions of both the head carriage 38 and the temperature-compensating member 39 and the relationship therebetween are identical with those in the embodiment shown in FIGS. 7 and 8.

In FIG. 13, reference numeral 77 denotes a motor for moving the magnetic head. A cam plate 79 provided with a spiral-shaped cam groove 79A is mounted on a shaft 77A of the motor 77.

A guide pin 39C of the temperature-compensating member 39 engages with the cam groove 79A. According to such construction, it is possible to move the head carriage 38 and the magnetic head 1 in a direction "A" or "B" by rotatably driving the cam plate 79 in a direction "A" or "B" through the motor 77.

In FIG. 13, the head carriage 38 is fixed to the temperature-compensation member 39 by the screws 41 as is in the embodiment shown in FIGS. 7 and 8. According to such construction, as shown in FIG. 13, it is possible to employ the above equation (6) as an equation for performing the temperature-compensation of the unit, only provided that: the thermal expansion coefficient of the cam plate 79 is denoted by reference character $\alpha_4$; and the distance between the center of the cam plate 79 and the enter of the guide pin 39C is denoted by reference numeral $l_4$. Consequently, also in this embodiment, it is possible to provide considerable flexibility in the designing of each of the mounting positions of the motor 77 and the materials of each of the members of the unit of this embodiment by employing the temperature-compensating member, as is in the other embodiments of the present invention.

Further, the present invention is also applicable to a magnetic disc pack unit which simultaneously performs recording/reproducing operations of the information in a plurality of magnetic discs.

What is claimed is:

1. A magnetic disc unit comprising:
   means for driving a magnetic disc;
   magnetic head means including a first magnetic head and a second magnetic head for recording and/or reproducing information on opposite surfaces of said magnetic disc;
   magnetic head driving means for transferring said first and second magnetic heads to predetermined position on said magnetic disc;
   a temperature-compensating member for compensating relative misalignment between said first and second magnetic heads due to a variation in temperature;
   a first magnetic head supporting member supporting said first magnetic head and being mounted on said magnetic head driving means via said temperature-compensating member; and
   a second magnetic head supporting member supporting said second magnetic head and being mounted on said magnetic head driving means via said temperature-compensating member, wherein said first and second magnetic head supporting members are mounted on said temperature-compensating member at positions separated from each other by a distance corresponding to the difference in the thermal expansion coefficients of said first and second magnetic head supporting members.

2. The magnetic disc unit as claimed in claim 1, wherein said temperature-compensating member is made of polycarbonate resin.

3. The magnetic disc unit as claimed in claim 1, wherein said first magnet head supporting member and said second magnetic head supporting member have small thermal expansion coefficients which are substantially the same.

4. The magnetic disc unit as claimed in claim 1, wherein said first magnetic head supporting member and said second magnetic head supporting member are made of partially different metals.

5. The magnetic disc unit as claimed in claim 1, wherein said driving means drives a plurality of magnetic discs: and said magnetic head means comprises a plurality of pairs of said first and said second magnetic heads.

6. The head access unit as claimed in claim 1, further comprising a plurality of supporting members, each of said supporting members being interposed between each of said heads and said compensating means, and each of said supporting members having substantially the same thermal properties.

7. The magnetic disc unit as claimed in claim 1, wherein said magnetic head driving means is a linear motor.

8. The magnetic disc unit as claimed in claim 7, wherein said linear motor has a traveling element, and wherein said magnetic head supporting members are mounted on said traveling element via said temperature-compensating member.

9. The magnetic disc unit as claimed in claim 1, wherein said magnetic head driving means is a cam mechanism driven by a motor.

10. The magnetic disc unit as claimed in claim 9, wherein said cam mechanism has a cam follower, and wherein said magnetic head supporting member is mounted on said cam follower via said temperature-compensating member.

11. The magnetic disc unit as claimed in claim 1, wherein said first magnetic head supporting member and said second magnetic head supporting member are made of the same material.

12. The magnetic disc unit as claimed in claim 11, wherein said first magnetic support member and said second magnetic head supporting member are made of stainless steel.

13. The magnetic disc unit as claimed in claim 11, wherein said first magnetic head supporting member and said second magnetic head supporting member are made of phosphor bronze.

14. A head access unit comprising:
   head means for recording and/or reproducing of signals in a recording medium;
   a head carriage supporting said head means;

a guide shaft for guiding said head carriage in relation to said recording medium, said guide shaft being provided on a chassis;

head drive means for transferring said head carriage along said guide shaft; and a compensating plate, connected to said head means and said head carriage, said compensating plate being directly engaged with said guide shaft and said head drive means for compensating a relative misalignment between said head means and said recording medium due to variations in temperature.

15. The magnetic disc unit as claimed in claim 14, wherein said head means comprises a plurality of heads acting on said recording medium.

16. A head access unit as claimed in claim 14, wherein said head drive means is a cam mechanism driven by a motor.

17. A head access unit as claimed in claim 14, wherein said head means is a magnetic head.

18. A head access unit as claimed in claim 17 wherein said recording medium is a magnetic disc.

* * * * *